J. H. NOYES, dec'd,
DOVER STAMPING COMPANY, assignees.
Nozzle Stopper for Oil Can.
No. 9,398. Reissued Oct. 5, 1880.
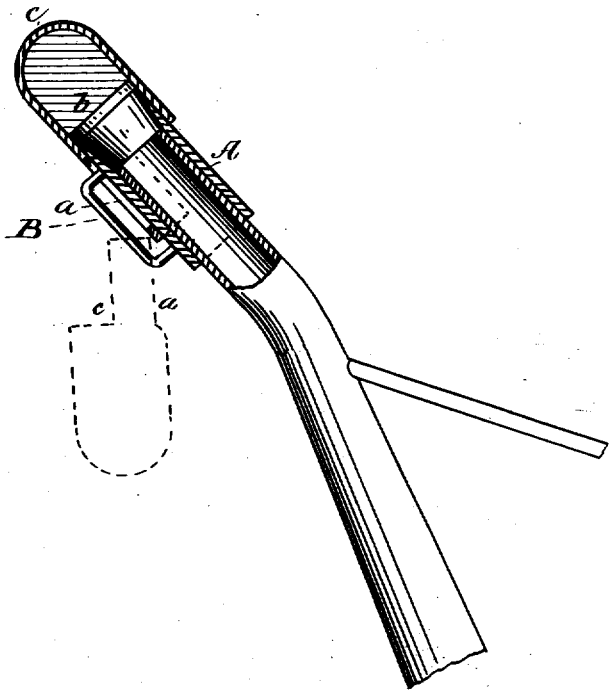
WITNESSES
A. J. Oettinger
Geo F. Walker
INVENTOR
Dover Stamping Company
assignee of
Jonathan H. Noyes
by their attys
Clarke & Raymond.
N. PETERS, PHOTO-LITHOGRAPHER, WASHINGTON, D. C.

UNITED STATES PATENT OFFICE.

DOVER STAMPING COMPANY, OF BOSTON, MASSACHUSETTS, ASSIGNEE OF JOSIAH H. NOYES, DECEASED.

NOZZLE-STOPPER FOR OIL-CANS.

SPECIFICATION forming part of Reissued Letters Patent No. 9,398, dated October 5, 1880.

Original No. 114,467, dated May 2, 1871. Application for reissue filed August 2, 1880.

*To all whom it may concern:*

Be it known that JOSIAH H. NOYES, of Abington, in the county of Plymouth and State of Massachusetts, did invent a new and useful Improvement in Stoppers for Nozzles of Oil-Cans; and that the following is a full, clear, and exact description thereof, and will enable others skilled in the art to make and use the same, reference being had to the accompanying drawing, forming part of this specification.

This invention relates to improvements in the stoppers for the spouts or nozzles of oil-cans, the object of which is to provide a more reliable stopper than any now in use.

The invention consists in a cap for an oil-can nozzle, made to fit snugly over the open end of the nozzle or over the open end of a short tube fitted tightly upon the nozzle, said cap being closed at its outer end, and being provided with a cork stopper or packing, the cap-tube having a long slot, by means of which it runs upon and is held by a guide wire or staple, and being cut half away on the side of the slot for a short distance, so that it can be readily slid off of the nozzle and turned up therefrom.

The drawing represents an elevation of a can-nozzle having my improvement, shown in section.

A represents a short section of tube, slightly tapered, and adapted to be fitted tightly and permanently on the nozzle of the can, the metal being sharpened at the outer end either by reaming or swaging it in dies.

C represents another short tube, closed at one end, and provided in the said closed end with cork or other similar packing, *b*. It is connected to the section A by a link, B, passing through a slotted extension on one side, so arranged as to allow it to slide sufficiently for application to and removal from the part A. When forced down on the part A the sharpened end thereof will enter the packing *b* and make an air-tight joint.

This arrangement provides a simple and cheap stopping device, which gives much better results than the common metallic caps now in use, for although cork or other packing may be employed with them, it is not available, for the reason that the nozzles are seldom sharpened and will not cut into the said packing. Moreover, they work too loosely on the ends of the nozzles after a short time.

In some cases the parts C may be made without the closed end depending on the cork packing for closing it, and when formed in this way they may be constructed by punching them out of sheet metal and forming the extension and the slot therein all at one blow, and they may then be rolled up and the edge joined by soldering or otherwise. By this plan they may be made of heavy metal and very cheaply.

We claim as the invention of JOSIAH H. NOYES—

1. The cap C, provided with the runner-slot *a* and with the packing *b*, and cut away on one side, as seen at *c*, all as shown and described.

2. A nozzle-cap having its interior surface parallel to the exterior surface of the nozzle and adapted to snugly fit it, and provided with a runner-slot, substantially as and for the purposes described.

3. The combination of a nozzle-cap having its interior surface parallel to the exterior surface of the nozzle, adapted to snugly fit it, and having a runner-slot, the nozzle, and a fastening link or guide, B, substantially as and for the purposes described.

4. The combination of the slotted cap having its interior surface parallel to the exterior surface of the nozzle, and adapted to fit snugly thereon, the guide-wire, and the nozzle with each other, substantially as described.

DOVER STAMPING CO.,
By L. BACON FOSS,
*General Manager.*

Witnesses:
F. F. RAYMOND, 2d,
A. J. OETTINGER.